United States Patent
Horikoshi et al.

(10) Patent No.: US 10,651,944 B2
(45) Date of Patent: May 12, 2020

(54) OPTICAL TRANSMITTER, OPTICAL RECEIVER, OPTICAL DATA TRANSMISSION SYSTEM, OPTICAL TRANSMISSION METHOD, AND OPTICAL RECEPTION METHOD

(71) Applicant: NIPPON TELEGRAPH AND TELEPHONE CORPORATION, Tokyo (JP)

(72) Inventors: Kengo Horikoshi, Yokosuka (JP); Seiji Okamoto, Yokosuka (JP); Asuka Matsushita, Yokosuka (JP); Mitsuteru Yoshida, Yokosuka (JP); Fukutaro Hamaoka, Tokyo (JP); Yoshiaki Yamada, Yokosuka (JP); Yoshiaki Kisaka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/320,065

(22) PCT Filed: Jul. 26, 2017

(86) PCT No.: PCT/JP2017/027031
§ 371 (c)(1),
(2) Date: Jan. 23, 2019

(87) PCT Pub. No.: WO2018/021403
PCT Pub. Date: Feb. 1, 2018

(65) Prior Publication Data
US 2019/0273560 A1  Sep. 5, 2019

(30) Foreign Application Priority Data
Jul. 28, 2016 (JP) ................. 2016-148460

(51) Int. Cl.
*H04B 10/516* (2013.01)
*H04B 10/60* (2013.01)
(Continued)

(52) U.S. Cl.
CPC .......... *H04B 10/516* (2013.01); *H04B 1/707* (2013.01); *H04B 10/077* (2013.01); *H04B 10/60* (2013.01);
(Continued)

(58) Field of Classification Search
None
See application file for complete search history.

(56) References Cited

U.S. PATENT DOCUMENTS

| | | | |
|---|---|---|---|
| 6,616,254 B1 * | 9/2003 | Raphaeli | H04B 1/69 375/135 |
| 7,702,245 B1 | 4/2010 | Mork et al. | |

(Continued)

FOREIGN PATENT DOCUMENTS

| | | |
|---|---|---|
| JP | 2006254443 A | 9/2006 |
| JP | 2012105351 A | 5/2012 |

(Continued)

OTHER PUBLICATIONS

International Search Report for PCT/JP2017/027031, ISA/JP, Tokyo, dated Oct. 17, 2017, with English translation attached.

(Continued)

*Primary Examiner* — Li Liu
(74) *Attorney, Agent, or Firm* — Harness, Dickey & Pierce, P.L.C.

(57) ABSTRACT

An optical transmitter of an optical data transmission system transmitting data through an optical fiber transmission path includes a main signal generator that converts first transmission data into a predetermined signal format to generate a first signal, a DCSK modulator that DCSK-modulates (Continued)

second transmission data to generate a second signal, a signal-multiplexer that performs time-division multiplexing of the first signal and the second signal, and an electro-optical converter that converts a multiplexed signal obtained by the time-division multiplexing of the signal-multiplexer from an electric signal into an optical signal, and outputs the optical signal to the optical fiber transmission path.

8 Claims, 7 Drawing Sheets

(51) Int. Cl.
  *H04J 14/08* (2006.01)
  *H04B 10/077* (2013.01)
  *H04B 1/707* (2011.01)
  *H04B 10/61* (2013.01)
  *H04B 10/69* (2013.01)
(52) U.S. Cl.
  CPC ........... *H04B 10/616* (2013.01); *H04B 10/69* (2013.01); *H04J 14/08* (2013.01)

(56) References Cited

U.S. PATENT DOCUMENTS

| 2006/0239689 A1* | 10/2006 | Ashdown | H04B 10/1141 |
| | | | 398/130 |
| 2008/0232815 A1 | 9/2008 | Shioiri et al. | |
| 2015/0132006 A1* | 5/2015 | Inoue | H05B 37/0263 |
| | | | 398/118 |
| 2015/0139341 A1* | 5/2015 | Huettner | H04B 3/546 |
| | | | 375/257 |

FOREIGN PATENT DOCUMENTS

| JP | 2014-187525 A | 10/2014 | |
| JP | 2014-191534 A | 10/2014 | |
| JP | 2015-188165 A | 10/2015 | |
| JP | 2015-530773 A | 10/2015 | |
| JP | 2015188165 | * 10/2015 | .............. H04J 14/00 |

OTHER PUBLICATIONS

Kaddoum, Georges et al., "NR-DCSK: A Noise Reduction Differential Chaos Shift Keying System", IEEE Transactions on Circuits and Systems—II: Express Briefs, vol. 63, No. 7, pp. 648-652, Jul. 2016.

Japanese Notice of Allowance regarding JP2018530351, dated Nov. 26, 2019.

Extended European Search Report from counterpart EP17834405.7, dated Feb. 26, 2020.

* cited by examiner

OPTICAL TRANSMITTER, OPTICAL RECEIVER, OPTICAL DATA TRANSMISSION SYSTEM, OPTICAL TRANSMISSION METHOD, AND OPTICAL RECEPTION METHOD

CROSS-REFERENCE TO RELATED APPLICATIONS

This application is a 371 U.S. National Stage of International Application No. PCT/JP2017/027031, filed on Jul. 26, 2017, which claims priority on Japanese Patent Application No. 2016-148460, filed in Japan on Jul. 28, 2016. The contents of both of the above applications are incorporated herein by reference.

TECHNICAL FIELD

The present invention relates to a technique of optical communication.

BACKGROUND ART

With the progress of digital coherent optical transmission techniques in recent years, high-speed and long-distance optical data transmission having a capacity of 100 Gbit/s per wavelength channel has been commercialized. However, research and development on optical data transmission systems having a larger capacity have been actively carried out in order to cope with the increasing demand for network traffic transfer, and an increase of a transmission capacity by multi-valuing and an increase in a baud rate have been proposed.

In optical data transmission, data communication is performed through an optical fiber. It is necessary to reduce the power of a signal capable of being input to an optical fiber to approximately equal to or less than 10 dBm due to the necessity of avoiding signal distortion due to nonlinear optical effects occurring in an optical fiber. When a transmission capacity is increased by multi-valuing and an increase in a baud rate, energy distributed per bit decreases. For this reason, bit errors easily occur, and a distance over which transmission is possible tends to decrease. In recent years, a communication system which is operable by supporting and switching among a plurality of modulation schemes has also been proposed.

In a communication system operated by switching among a plurality of modulation schemes, it is necessary to set a modulation scheme and the like between terminals. It is desirable that such a modulation scheme is automatically set, from the viewpoint of improving operability.

In addition, as another problem, in a large capacity optical transmission channel exceeding 100 Gbit/s, signal processing such as pre-equalization of transmission path frequency characteristics may be performed on a transmission side. In order to perform appropriate signal processing on the transmission side, it is necessary to feedback parameters, such as transmission channel information obtained on a reception side and the quality of a received signal, back to the transmission side.

In order to realize the above-described automatic setting of a modulation scheme and feedback of parameters for transmission-side signal processing, it is necessary to provide a control channel between terminals. In order to realize automatic setting of a modulation scheme, communication needs to be established prior to connecting of a main signal in the control channel. Further, in order to realize the feedback of parameters for transmission-side signal processing, the control channel needs to provide high reliability even when stable communication cannot be established due to frequent occurrence of errors in a main signal.

An example in the related art of a control channel satisfying such requirements is disclosed in Patent Literature 1. In the technique disclosed in Patent Literature 1, a waveform in which energy locally exists in a frequency region is used for the transmission of a control signal and is time-multiplexed to a main signal.

CITATION LIST

Patent Literature

[Patent Literature 1]
Japanese Unexamined Patent Application, First Publication No. 2014-187525

SUMMARY OF INVENTION

Technical Problem

However, as disclosed in Patent Literature 1, when a control signal having a signal waveform greatly different from that of a main signal is time-multiplexed to a main signal, there is a risk of causing an adverse effect will be exerted on a signal of an adjacent wavelength channel due to nonlinearity of an optical fiber. In future ultra-large capacity optical data transmission of the 1 Tbit/s class, such adverse effect will not be negligible. For this reason, it is desirable to construct a channel for control using a waveform with characteristics close to those of a main signal.

In view of the above-described circumstances, an object of the present invention is to provide a technique in which adverse effects are prevented from being exerted on a main signal and in which a signal for control is able to be multiplexed with the main signal with high reliability.

Solution to Problem

An optical transmitter in a first aspect of the present invention, which is an optical transmitter of an optical data transmission system transmitting data through an optical fiber transmission path, includes a main signal generator that converts first transmission data into a predetermined signal format to generate a first signal, a Differential Code Shift Keying (DCSK) modulator that DCSK-modulates second transmission data to generate a second signal, a signal-multiplexer that performs time-division multiplexing of the first signal and the second signal, and an electro-optical converter that converts a multiplexed signal obtained by the time-division multiplexing of the signal-multiplexing unit from an electrical signal to an optical signal, and outputs the optical signal to the optical fiber transmission path.

According to a second aspect of the present invention, the optical transmitter of the first aspect further includes a mapper that maps the second transmission data to a point on a signal space diagram to generate a symbol, the DCSK modulator includes a reference pseudo-random sequence generation circuit that generates a reference pseudo-random sequence, a signal pseudo-random sequence generation circuit that generates a signal pseudo-random sequence, and a time-series signal generator that time-division multiplexes the reference pseudo-random sequence and the signal pseudo-random sequence to generate a single time-series signal as the second signal, and the signal pseudo-random sequence is consistent with a product of the reference pseudo-random sequence and the symbol.

According to a third aspect of the present invention, the optical transmitter of the first aspect further includes a mapper that maps the second transmission data to a point on a signal space diagram to generate a symbol, the DCSK modulator includes a pseudo-random sequence generator that generates a pseudo-random sequence, a multiplier that multiplies the pseudo-random sequence by the symbol and outputs a multiplication result as a signal pseudo-random sequence, and a time-series signal generator that time-division multiplexes the pseudo-random sequence and the signal pseudo-random sequence to generate a single time-series signal as the second signal.

An optical receiver in a fourth aspect of the present invention, which is an optical receiver of an optical data transmission system transmitting data through an optical fiber transmission path, includes a photoelectric converter that converts an optical signal received through the optical fiber transmission path into an electric signal, a signal separator that separates a first signal and a second signal from the electric signal, the first and second signals having been time-division multiplexed, a main signal demodulator that demodulates the first signal separated by the signal separator to reproduce first transmission data, and a Differential Code Shift Keying (DCSK) demodulator that DCSK-demodulates the second signal separated by the signal separator to reproduce second transmission data.

According to a fifth aspect of the present invention, in the optical receiver of the fourth aspect, the DCSK demodulator includes a signal sequence extractor that identifies a reference pseudo-random sequence and a signal pseudo-random sequence and extracts the identified sequences from the second signal and an inner product calculator that calculates an inner product of the reference pseudo-random sequence and the signal pseudo-random sequence and outputs the inner product as the second transmission data.

An optical data transmission system in a sixth aspect of the present invention includes the optical transmitter according to any one of the first to third aspects and the optical receiver according to the fourth or fifth aspect.

A transmission method in a seventh aspect of the present invention, which is an optical transmission method performed by an optical transmitter of an optical data transmission system transmitting data through an optical fiber transmission path, includes a main signal generation step of converting first transmission data into a predetermined signal format to generate a first signal, a Differential Code Shift Keying (DCSK) modulation step of DCSK-modulating second transmission data to generate a second signal, a signal-multiplexing step of performing time-division multiplexing of the first signal and the second signal, and an electro-optical conversion step of converting a multiplexed signal obtained by the time-division multiplexing performed in the signal-multiplexing step from an electric signal into an optical signal, and outputting the optical signal to the optical fiber transmission path.

A reception method in an eighth aspect of the present invention, which is an optical reception method performed by an optical receiver of an optical data transmission system transmitting data through an optical fiber transmission path, includes a photoelectric conversion step of converting an optical signal received through the optical fiber transmission path into an electric signal, a signal separation step of separating a first signal and a second signal from the electric signal, the first and second signals having been time-division multiplexed, a main signal demodulation step of demodulating the first signal separated in the signal separation step to reproduce first transmission data, and a Differential Code Shift Keying (DCSK) demodulation step of DCSK-demodulating the second signal separated in the signal separation step to reproduce second transmission data.

Advantageous Effects of Invention

According to the present invention, it is possible to suppress the adverse effect to be exerted on a main signal and multiplex a signal for control to the main signal with high reliability.

DESCRIPTION OF EMBODIMENTS

First Embodiment

Figure 1:
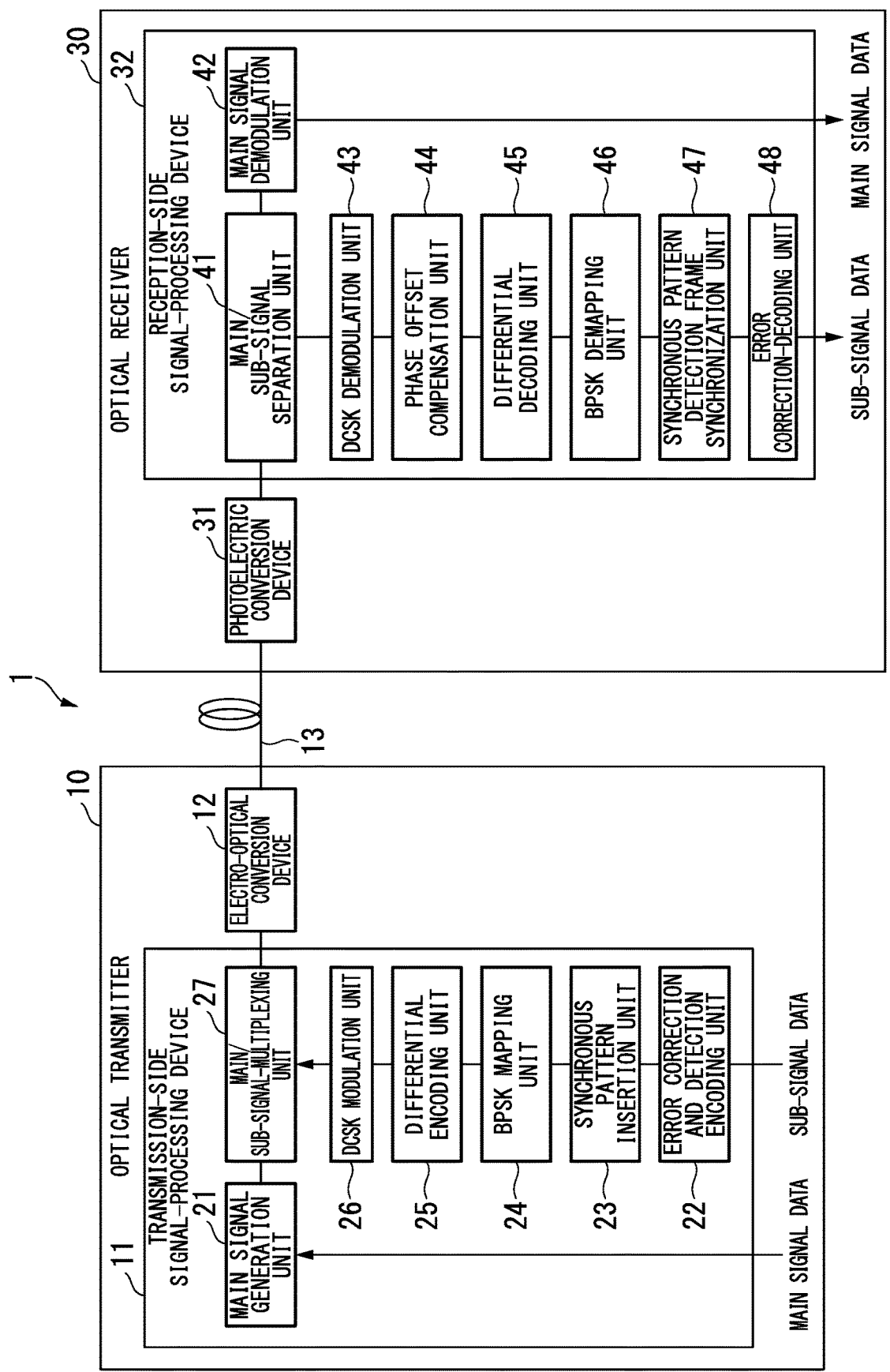
FIG. 1 is a block diagram illustrating the overall configuration of an optical data transmission system according to a first embodiment of the present invention.

FIG. 1 is a block diagram illustrating the overall configuration of an optical data transmission system 1 according to a first embodiment of the present invention. The optical data transmission system 1 includes an optical transmitter 10, an optical receiver 30 and an optical fiber transmission path 13 connecting the optical transmitter 10 and the optical receiver 30 to each other. The optical transmitter 10 includes a transmission-side signal-processing device 11 and an electro-optical conversion device 12. The transmission-side signal-processing device 11 generates a signal to be transmitted at an electric stage. The transmission-side signal-processing device 11 includes a main signal generation unit 21, an error correction and detection encoding unit 22, a synchronous pattern insertion unit 23, a Binary Phase Shift Keying (BPSK) mapping unit 24, a differential encoding unit 25, a Differential Code Shift Keying (DCSK) modulation unit 26 and a main/sub-signal-multiplexing unit 27.

The main signal generation unit 21 maps main signal data to a signal in a format appropriate for optical transmission. The error correction and detection encoding unit 22, the synchronous pattern insertion unit 23, the BPSK mapping unit 24 and the differential encoding unit 25 perform error correction encoding, synchronous pattern insertion, BPSK symbol mapping and differential encoding on sub-signal data in this order. The DCSK modulation unit 26 DCSK-modulates a differentially encoded symbol of the sub-signal data. The main/sub-signal-multiplexing unit 27 performs time-division multiplexing of a main signal (first signal)

obtained by mapping the main signal data and a sub-signal (second signal) obtained by DCSK-modulating the differentially encoded symbol of the sub-signal data. The electro-optical conversion device 12 converts a multiplexed signal obtained by performing the time-division multiplexing by the main/sub-signal-multiplexing unit 27 from an electrical signal into an optical signal and transmits the optical signal to the optical receiver 30 through the optical fiber transmission path 13.

The optical receiver 30 includes a photoelectric conversion device 31 and a reception-side signal-processing device 32. The photoelectric conversion device 31 converts the optical signal received through the optical fiber transmission path 13 into an electric signal. The reception-side signal-processing device 32 reproduces main signal data and sub-signal data from the electric signal at the electric stage. The reception-side signal-processing device 32 includes a main/sub-signal separation unit 41, a main signal demodulation unit 42, a DCSK demodulation unit 43, a phase offset compensation unit 44, a differential decoding unit 45, a BPSK demapping unit 46, a synchronous pattern detection frame synchronization unit 47 and an error correction-decoding unit 48.

The main/sub-signal separation unit 41 separates the main signal (first signal) and the sub-signal (second signal) having been subjected to time-division multiplexing from the electric signal converted from the optical signal. The main signal demodulation unit 42 demodulates the main signal to reproduce the main signal data. The DCSK demodulation unit 43 DCSK-demodulates the sub-signal separated by the main/sub-signal separation unit 41 to demodulate the symbol of the sub-signal data. The phase offset compensation unit 44, the differential decoding unit 45, the BPSK demapping unit 46, the synchronous pattern detection frame synchronization unit 47 and the error correction-decoding unit 48 perform phase offset compensation, differential decoding, BPSK demapping, frame synchronization, and error correction processing on the demodulated symbol of the sub-signal data in this order to reproduce the sub-signal data.

Processing to be performed by the optical transmitter 10 will be described. In FIG. 1, the main signal data is transmitted to the main signal generation unit 21. The main signal generation unit 21 maps the main signal data on a signal space diagram in a format (predetermined signal format) appropriate for optical transmission, and transmits a main signal obtained by the mapping to the main/sub-signal-multiplexing unit 27.

Payload data is assumed as the main signal data (first transmission data). In the first embodiment, regarding a main signal, a signal format of polarization multiplexing Quadrature Amplitude Modulation (QAM) is assumed, but other signal formats such as a variable-length code and hybrid modulation may be used. In addition, the main signal generation unit 21 can use an error correction code for main signal data.

Data for controlling the overall optical data transmission system 1 is assumed as the sub-signal data (second transmission data). The error correction and detection encoding unit 22 performs error correction encoding on the sub-signal data. The synchronous pattern insertion unit 23 inserts a synchronous pattern into the sub-signal data having been subjected to the error correction encoding. The BPSK mapping unit 24 maps the sub-signal data having the synchronous pattern inserted thereinto to a symbol on a signal space diagram. The differential encoding unit 25 performs differential encoding on the symbol of the sub-signal data.

Although error correction encoding performed by the error correction and detection encoding unit 22 is not particularly assumed, it is desirable to install it in the error correction and detection encoding unit from the viewpoint of reliability. As will be described later, the synchronous pattern inserted by the synchronous pattern insertion unit 23 is required for the detection of an error correction block and the like in the reception-side signal-processing device 32. Further, in the first embodiment, the phase offset compensation unit 44 is included in a circuit on the reception side, and a phase cycle slip may occur on the reception side. For this reason, it is necessary to perform differential encoding, and the differential encoding is performed by the differential encoding unit 25. Further, in the first embodiment, BPSK is used as a modulation scheme for the sub-signal data, but Quadrature Phase Shift Keying (QPSK), PSK, QAM, or the like can be used. The speed of modulation for the sub-signal data may be lower than the speed of modulation for the main signal data.

The differentially encoded symbol of the sub-signal data which is obtained by the differential encoding unit 25 is input to the DCSK modulation unit 26. The DCSK modulation unit 26 DCSK-modulates the differentially encoded symbol of the sub-signal data. The DCSK modulation is a modulation scheme for loading a signal onto an inner product of a pair of pseudo-random sequences of a reference pseudo-random sequence and a signal pseudo-random sequence. The DCSK modulation unit 26 outputs a symbol sequence obtained by the DCSK modulation performed on the differentially encoded symbol of the sub-signal data as a sub-signal. In the first embodiment, it is assumed that polarization diversity is performed by performing polarization multiplexing of a signal obtained by DCSK-modulating the differentially encoded symbol of the sub-signal data with a pseudo-random sequence of horizontal polarization and a signal obtained by DCSK-modulating the differentially encoded symbol of the sub-signal data with a pseudo-random sequence of vertical polarization.

The DCSK modulation unit 26 transmits the sub-signal obtained by performing the DCSK modulation to the main/sub-signal-multiplexing unit 27. The main/sub-signal-multiplexing unit 27 time-division multiplexes the main signal and the sub-signal. The main/sub-signal-multiplexing unit 27 transmits a multiplexed signal obtained by performing the time-division multiplexing to the electro-optical conversion device 12. The electro-optical conversion device 12 converts the multiplexed signal from an electric signal into an optical signal, and outputs the optical signal to the optical fiber transmission path 13. The optical signal is transmitted to the optical receiver 30 through the optical fiber transmission path 13.

The electro-optical conversion device 12 inputs Continuous Wave (CW) light, an X polarization-side electric signal and a Y polarization-side electric signal so as to be able to cope with polarization multiplexing diversity in two mutually orthogonal polarization directions to generate a polarization-multiplexed optical signal. In a case where a main signal is QAM-modulated and transmitted, the electro-optical conversion device 12 includes an X polarization-side QAM modulator and a Y polarization-side QAM modulator.

Figure 2:
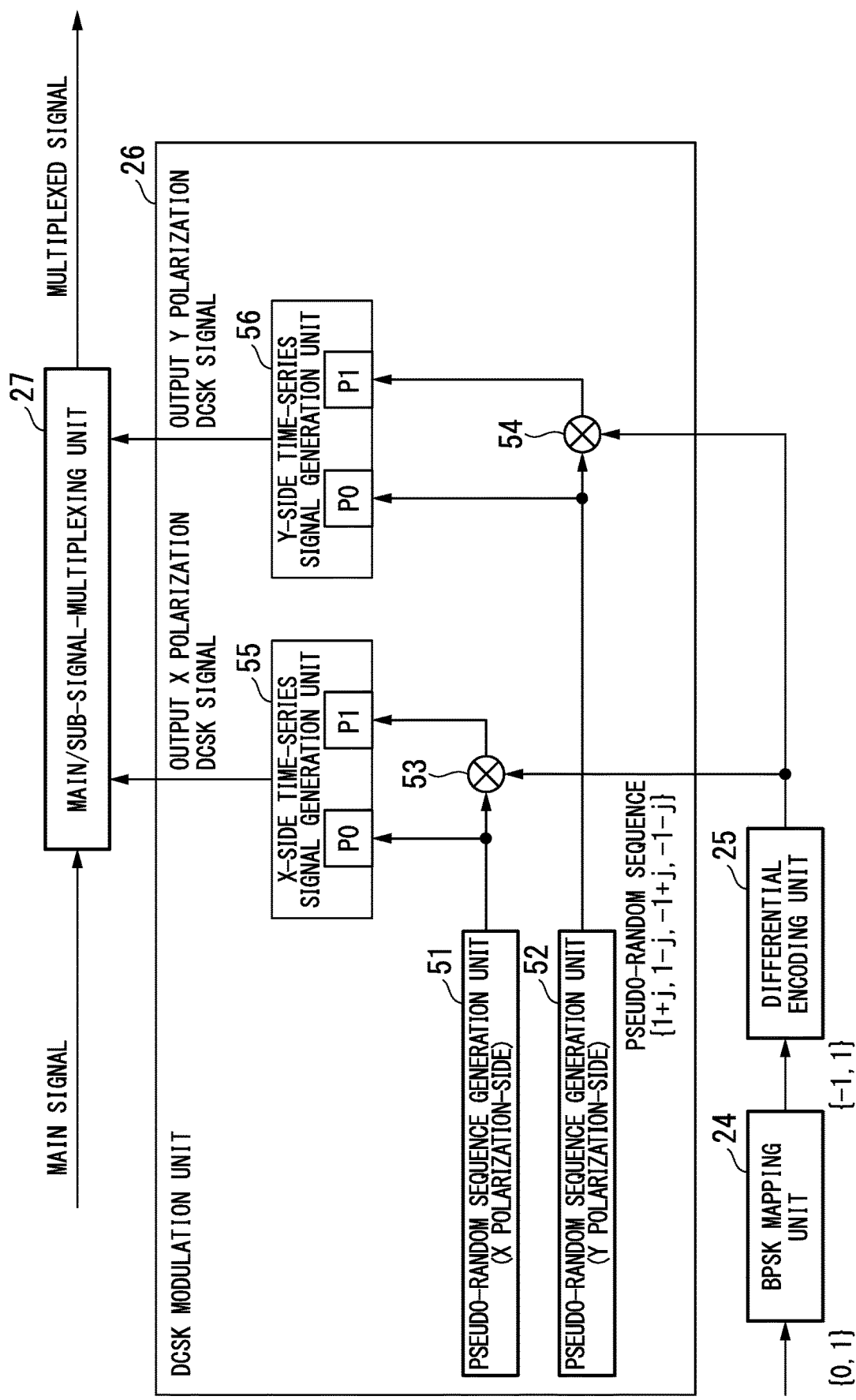
FIG. 2 is a block diagram illustrating a configuration of a DCSK modulation unit according to the first embodiment.

FIG. 2 is a block diagram illustrating a configuration of the DCSK modulation unit 26. The DCSK modulation unit 26 includes pseudo-random sequence generation units 51 and 52, multipliers 53 and 54, an X-side time-series signal generation unit 55 and a Y-side time-series signal generation unit 56. The pseudo-random sequence generation units 51 and 52 are examples of a reference pseudo-random sequence generation circuit. The multipliers 53 and 54 are examples of a signal pseudo-random sequence generation circuit.

The pseudo-random sequence generation units 51 and 52 respectively output pseudo-random sequences to an X polarization-side and a Y polarization-side. Apparent baud rates of the pseudo-random sequences generated by the pseudo-random sequence generation units 51 and 52 are consistent with a baud rate of a main signal. For example, the pseudo-random sequence generation units 51 and 52 may generate the pseudo-random sequences by generating a pseudo-random symbol at the same rate as a modulation rate when the main signal generation unit 21 generates a main signal from main signal data. In order to secure randomness of polarization of an optical signal, the pseudo-random sequence generation units 51 and 52 generate mutually uncorrelated pseudo-random sequences as the pseudo-random sequences on the X polarization-side and the Y polarization-side.

The pseudo-random sequence on the X polarization-side from the pseudo-random sequence generation unit 51 is split into two sequences, which are a reference pseudo-random sequence P0 and a signal pseudo-random sequence P1. The reference pseudo-random sequence P0 is transmitted to the X-side time-series signal generation unit 55. The sequence for the signal pseudo-random sequence P1 is transmitted to the multiplier 53. The differentially encoded symbol of the sub-signal data is transmitted to the multiplier 53 from the differential encoding unit 25. The multiplier 53 multiplies the differentially encoded symbol of the sub-signal data by the sequence for the signal pseudo-random sequence P1. The multiplier 53 transmits a multiplication result to the X-side time-series signal generation unit 55 as the signal pseudo-random sequence P1. The X-side time-series signal generation unit 55 performs time-division multiplexing of the reference pseudo-random sequence P0 on the X polarization-side and the signal pseudo-random sequence P1 on the X polarization-side to generate a single time-series signal as a DCSK-modulated signal on the X polarization-side.

The pseudo-random sequence on the Y polarization-side from the pseudo-random sequence generation unit 52 is split into two sequences, which are a reference pseudo-random sequence P0 and a signal pseudo-random sequence P1. The reference pseudo-random sequence P0 is transmitted to the Y-side time-series signal generation unit 56. The sequence for the signal pseudo-random sequence P1 is transmitted to the multiplier 54. The differentially encoded symbol of the sub-signal data is transmitted to the multiplier 54 from the differential encoding unit 25. The multiplier 54 multiplies the differentially encoded symbol of the sub-signal data by the sequence for the signal pseudo-random sequence P1 on the Y polarization-side. The multiplier 54 transmits a multiplication result to the Y-side time-series signal generation unit 56 as the signal pseudo-random sequence P1. The Y-side time-series signal generation unit 56 performs time-multiplexing of the reference pseudo-random sequence P0 on the Y polarization-side and the signal pseudo-random sequence P1 on the Y polarization-side to generate a single time-series signal as a DCSK-modulated signal on the Y polarization-side.

The DCSK-modulated signal generated by the X-side time-series signal generation unit 55 and the DCSK-modulated signal generated by the Y-side time-series signal generation unit 56 are transmitted to the main/sub-signal-multiplexing unit 27 as sub-signals. Time-division multiplexing of the main signal and the sub-signals is performed by the main/sub-signal-multiplexing unit 27, and a multiplexed signal is generated by the time-division multiplexing.

Figure 3:
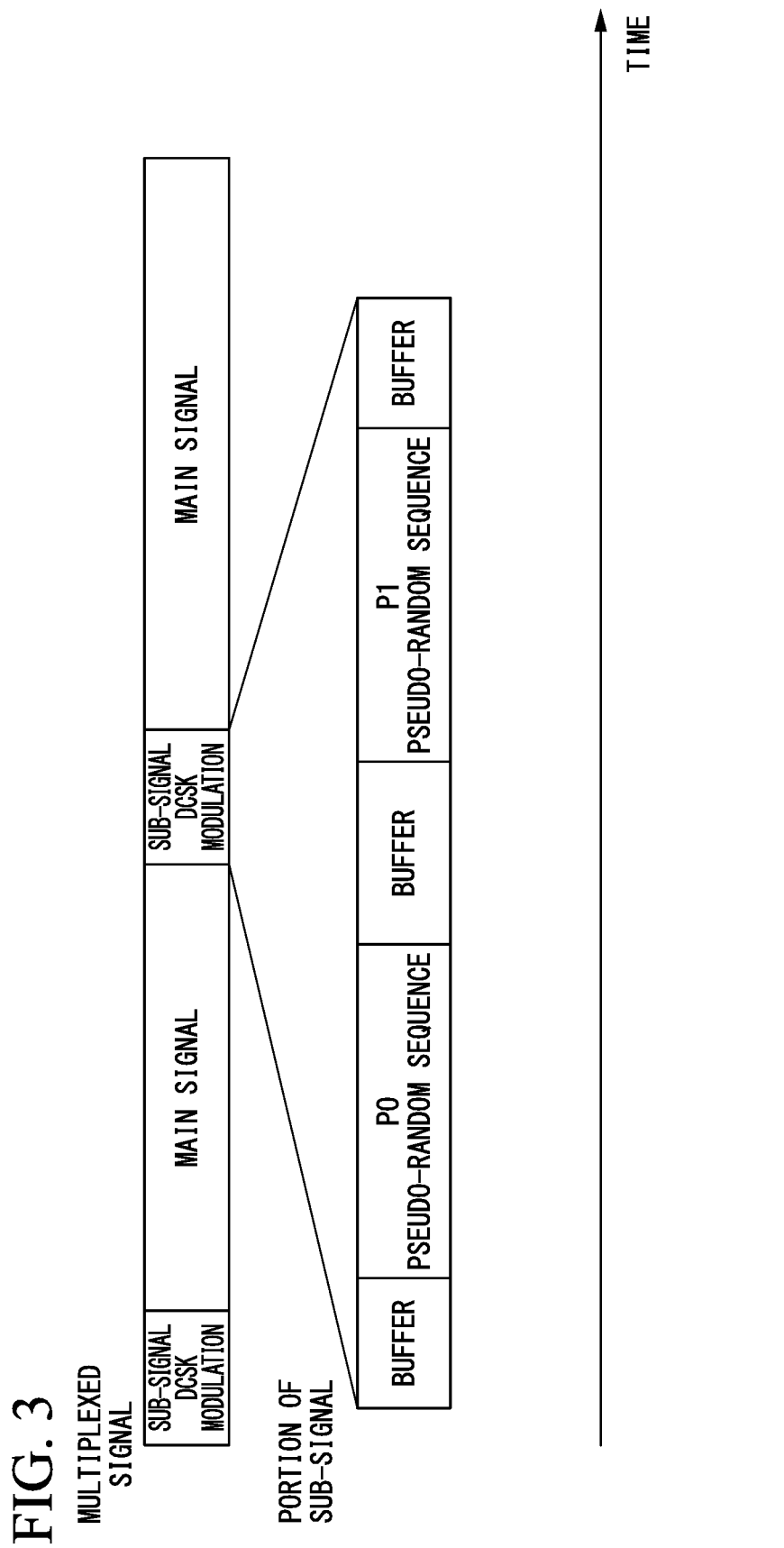
FIG. 3 is a diagram illustrating a structure of a signal which is time-multiplexed by a main/sub-signal-multiplexing unit in the first embodiment.

FIG. 3 illustrates a structure of a multiplexed signal generated by the main/sub-signal-multiplexing unit 27. A multiplexed signal output from the main/sub-signal-multiplexing unit 27 is divided into periods of main signals and periods of sub-signals, and the main signals and the sub-signals are multiplexed in time division in the respective periods. A DCSK-modulated signal is allocated to the period of the sub-signal. A reference pseudo-random sequence P0 and a signal pseudo-random sequence P1 are allocated to a portion allocated to the sub-signal by time-division multiplexing. A buffer sequence may be inserted between the reference pseudo-random sequence P0 and the signal pseudo-random sequence P1 or before or after the reference pseudo-random sequence P0 and the signal pseudo-random sequence P1.

Processing to be performed by the optical receiver 30 will be described. An optical signal obtained by multiplexing a main signal and a sub-signal is transmitted to the optical fiber transmission path 13. In the optical receiver 30, the optical signal received through the optical fiber transmission path 13 is converted into an electric signal by the photoelectric conversion device 31, and the electric signal is input to the reception-side signal-processing device 32.

A polarization diversity coherent photoelectric conversion device is assumed as the photoelectric conversion device 31. For this reason, the optical signal is converted into electric signals of at least two systems corresponding to horizontal polarization and vertical polarization by the photoelectric conversion device 31. In this case, polarization axes of the horizontal polarization and the vertical polarization are not necessarily consistent with X polarization and Y polarization on the transmission side. In a case where the main signal is QAM-modulated and transmitted, the photoelectric conversion device 31 includes an X polarization-side QAM demodulator and a Y polarization-side QAM demodulator.

The main/sub-signal separation unit 41 separates the electric signal input to the reception-side signal-processing device 32 into main signals and sub-signals. The main signal demodulation unit 42 performs demodulation processing on the main signal. The DCSK demodulation unit 43 inputs the sub-signal. The main/sub-signal separation unit 41 may separate the main signals and the sub-signals using information regarding a header included in the main signal or the sub-signal. In a case where the optical transmitter 10 and the optical receiver 30 are operated in synchronization with each other and frame lengths of main signals and sub-signals in a multiplexed signal are determined in advance, the main/sub-signal separation unit 41 may separate the main signals and the sub-signals at a timing based on the frame lengths determined in advance.

The DCSK demodulation unit 43 DCSK-demodulates the sub-signal. As described above, time-division multiplexing of the main signal and the sub-signal obtained by performing BPSK mapping, differential encoding, and DCSK modulation in this order on the sub-signal data is performed on the transmission side. Therefore, the DCSK demodulation unit 43 demodulates the sub-signal separated by the main/sub-signal separation unit 41 to acquire a differentially encoded symbol of the sub-signal data.

Figure 4:
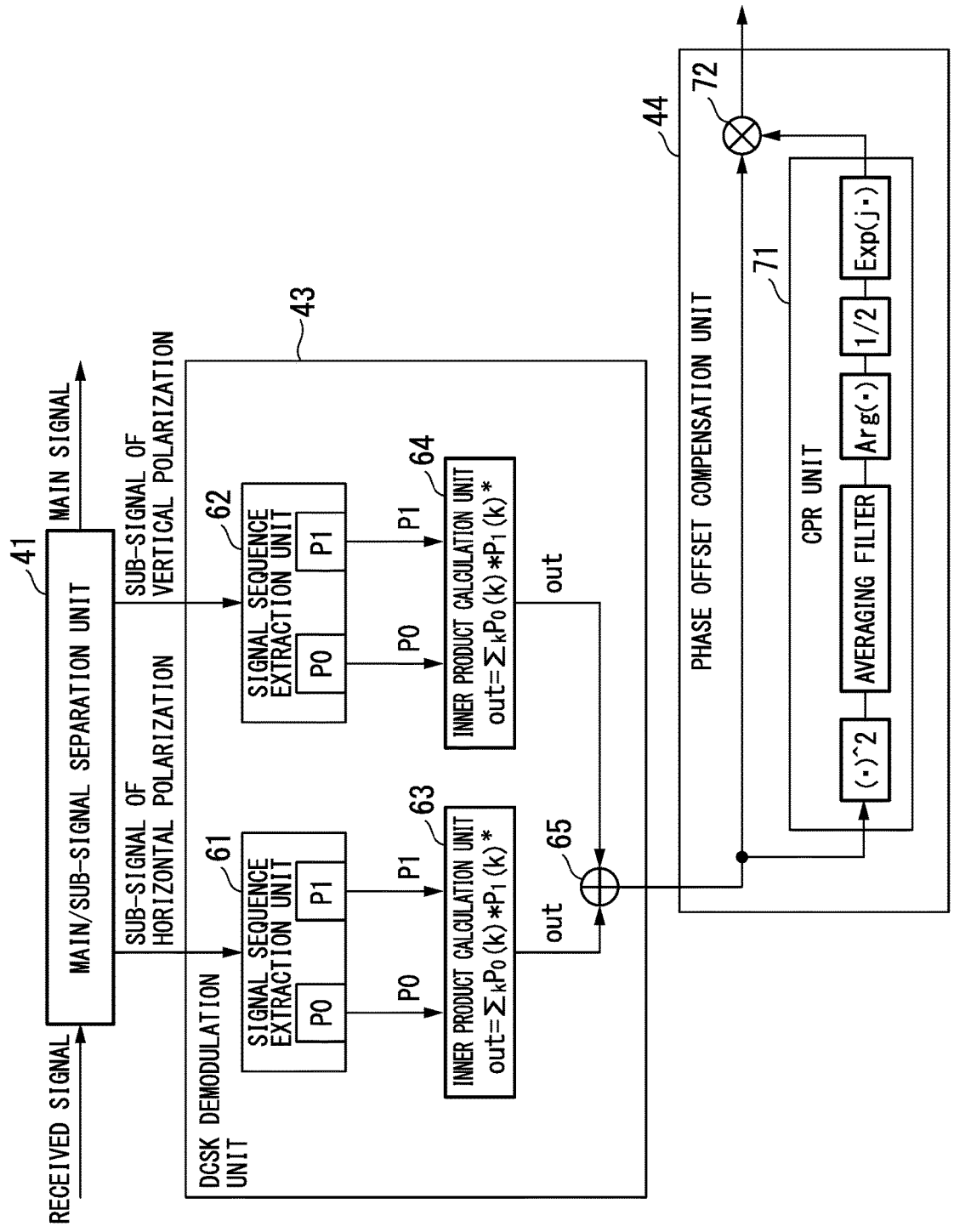
FIG. 4 is a diagram illustrating a configuration of a DCSK demodulation unit in the first embodiment.

FIG. 4 illustrates a configuration of the DCSK demodulation unit 43. The DCSK demodulation unit 43 includes signal sequence extraction units 61 and 62, inner product calculation units 63 and 64 and an adder 65.

Among the sub-signals separated by the main/sub-signal separation unit 41, a sub-signal of horizontal polarization is transmitted to the signal sequence extraction unit 61, and a sub-signal of vertical polarization is transmitted to the signal sequence extraction unit 62. The signal sequence extraction unit 61 identifies sequences corresponding to a reference pseudo-random sequence P0 and a signal pseudo-random sequence P1 and extracts the identified sequences from the sub-signal of horizontal polarization. The signal sequence extraction unit 62 identifies sequences corresponding to a reference pseudo-random sequence P0 and a signal pseudo-random sequence P1 and extracts the identified sequences from the sub-signal of vertical polarization. The signal sequence extraction unit 61 may extract the pseudo-random sequences P0 and P1 using information regarding a header included in the sub-signal. In a case where the optical transmitter 10 and the optical receiver 30 are operated in synchronization with each other and frame lengths of main signals and sub-signals in a multiplexed signal are determined in advance, the signal sequence extraction unit 61 may extract the pseudo-random sequences P0 and P1 at a timing based on the frame lengths determined in advance.

The signal sequence extraction unit 61 transmits the extracted reference pseudo-random sequence P0 and signal pseudo-random sequence P1 to the inner product calculation unit 63. The signal sequence extraction unit 62 transmits the extracted reference pseudo-random sequence P0 and signal pseudo-random sequence P1 to the inner product calculation unit 64.

The inner product calculation unit 63 calculates an inner product of the reference pseudo-random sequence P0 and the signal pseudo-random sequence P1 which are extracted by the signal sequence extraction unit 61. A symbol of sub-signal data is acquired from a sub-signal of horizontal polarization by calculating the inner product.

The inner product calculation unit 64 calculates an inner product of the reference pseudo-random sequence P0 and the signal pseudo-random sequence P1 which are extracted by the signal sequence extraction unit 62. A symbol of sub-signal data is acquired from a sub-signal of vertical polarization by calculating the inner product.

The adder 65 adds an output signal of the inner product calculation unit 63 and an output signal of the inner product calculation unit 64. Symbols of horizontal polarization and vertical polarization are synthesized by the addition, and thus the reliability of the symbols is improved. Note that the addition is an example of the synthesis of symbols, and symbols may be synthesized using other computation methods.

The DCSK demodulation unit 43 transmits a symbol of sub-signal data which is obtained by DCSK demodulation to the phase offset compensation unit 44. A demodulation output of the DCSK demodulation unit 43 is constituted by a differentially encoded BPSK symbol, but a phase offset may be included therein. The phase offset compensation unit 44 compensates for such a phase offset. The phase offset compensation unit 44 includes a Carrier Phase Recovery (CPR) unit 71 and a multiplier 72 as illustrated in FIG. 4. The CPR unit 71 calculates an average of results obtained by squaring each symbol to be input, and calculates a phase of an averaged symbol. A half value of the calculated phase is an estimated value of the phase offset. The CPR unit 71 outputs a complex number imparting rotation for cancelling out the estimated phase offset. The multiplier 72 multiplies the complex number output from the CPR unit 71 by the symbol of the sub-signal data to compensate for the phase offset in the symbol of the sub-signal data.

The symbol output by the phase offset compensation unit 44 is differentially decoded by the differential decoding unit 45, and is demodulated to a binary data sequence by the BPSK demapping unit 46. Further, the synchronous pattern detection frame synchronization unit 47 detects an error correction code block on the basis of a synchronous pattern in the binary data sequence. The error correction-decoding unit 48 decodes the error correction code for the binary data sequence, and thus sub-signal data is reproduced.

As described above, in the optical data transmission system 1 according to the first embodiment of the present invention, an optical signal obtained by performing time-division multiplexing of a sub-signal obtained by DCSK-modulating sub-signal data and a main signal obtained by modulating main signal data is transmitted. The sub-signal data includes data for controlling the overall optical data transmission system 1. That is, the optical data transmission system 1 performs time-division multiplexing of sub-signal data and main signal data modulated using a coherent optical differential encoding modulation scheme (Coherent Optical differential Code Shift Keying: CO-DCSK) and transmits the multiplexed data in order to provide a control channel for transmitting the sub-signal data as data for control. The CO-DCSK scheme is a scheme obtained by extending a DCSK scheme to optical transmission.

The DCSK-modulated signal is constituted by a set of a reference pseudo-random sequence and a signal pseudo-random sequence, and one symbol is coded by one set. Since light propagating through an optical fiber has two orthogonal polarization states of horizontally polarized light and vertically polarized light, it is possible to improve the quality of a received signal and increase a transmission capacity by performing polarization diversity or polarization multiplexing on the horizontally polarized light and the vertically polarized light in optical data transmission. Note that DCSK modulation is disclosed in, for example, Japanese Patent No. 3995601. In the first embodiment, different pseudo-random sequences are applied to two orthogonal polarization states and a polarization state of an optical signal is randomized from the necessity of randomizing a polarization state of an optical signal. The optical receiver 30 separates an optical signal in any polarization state into two orthogonal polarization states by coherent detection and converts the separated optical signals into an electric signals.

In the first embodiment, apparent baud rates of reference and signal pseudo-random sequences included in a DCSK-modulated signal are consistent with a baud rate of a main signal. Thereby, a spectrum of a DCSK-modulated signal of a control signal and a spectrum of a main signal are the same as each other. Since a substantial baud rate of sub-signal data in the DCSK-modulated signal is lower than a baud rate of the main signal, noise resistance of the sub-signal data is substantially higher than that of the main signal. Therefore, it is possible to establish communication of a control channel using a sub-signal even in a situation where a main signal is not conducted. In other words, the control channel can have a reliability sufficient to establish communication prior to the main signal.

In this manner, in the first embodiment, a control channel realized using a sub-signal has higher noise resistance than that of a main signal, and thus it is possible to establish communication prior to the main signal under all circumstances and to transmit information necessary for the establishment of communication of the main signal. The control channel has the same optical power spectrum as an optical power spectrum of the main signal, and also has randomness of a polarization state. A crosstalk of the control channel to an adjacent channel through nonlinearity is the same as a crosstalk of the main signal. Therefore, the optical data transmission system 1 is suitable for improving an optical data transmission system of the related art because it is not necessary to review the design of an optical transmission channel even in a case where time-division multiplexing of the control channel to the main signal is performed. The optical data transmission system 1 can multiplex the sub-signal and the main signal while suppressing the influence on the main signal.

Second Embodiment

An optical data transmission system according to a second embodiment of the present invention will be described. The optical data transmission system according to the second embodiment of the present invention is the same as the optical data transmission system 1 according to the first embodiment illustrated in FIG. 1 as the overall configuration, but there is a difference in configurations of a DCSK modulation unit 26 and a DCSK demodulation unit 43. In the optical data transmission system 1 according to the first embodiment, the DCSK modulation unit 26 and the DCSK demodulation unit 43 perform modulation and demodulation for each symbol. On the other hand, in the optical data transmission system according to the second embodiment, modulation and demodulation of N symbols are collectively performed using N (N is an integer) symbol collective DCSK modulation units and N symbol collective DCSK demodulation units. Note that a case of N=2 will be described in the second embodiment.

Figure 5:
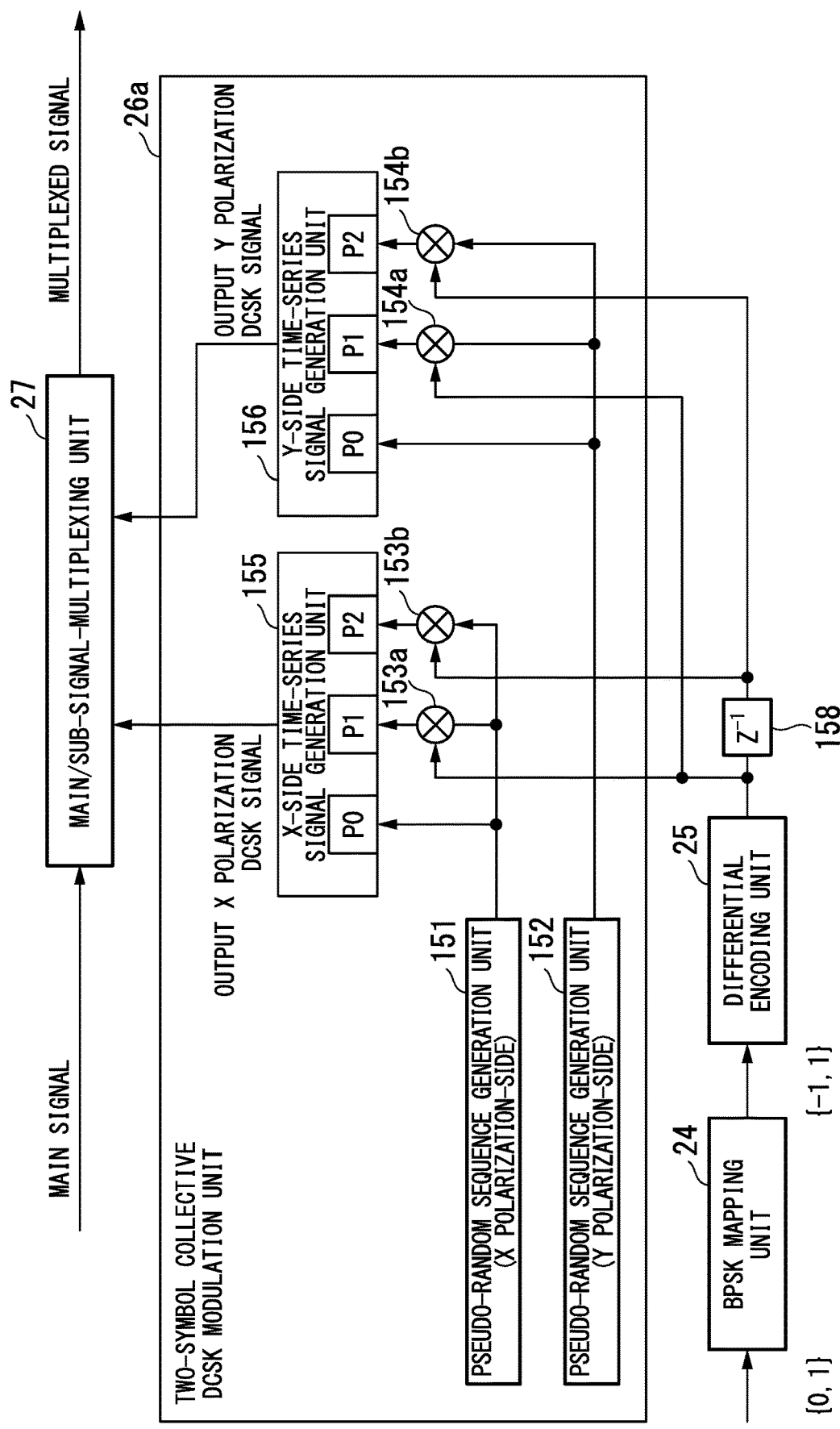
FIG. 5 is a diagram illustrating a configuration of a two-symbol collective DCSK modulation unit in an optical data transmission system according to a second embodiment of the present invention.

FIG. 5 illustrates a configuration of a two-symbol collective DCSK modulation unit 26a in the optical data transmission system according to the second embodiment. The two-symbol collective DCSK modulation unit 26a includes pseudo-random sequence generation units 151 and 152, multipliers 153a, 153b, 154a and 154b, an X-side time-series signal generation unit 155 and a Y-side time-series signal generation unit 156.

A pseudo-random sequence on an X polarization-side which is output from the pseudo-random sequence generation unit 151 is split into a sequence for a reference pseudo-random sequence P0, a sequence for a signal pseudo-random sequence P1 and a sequence for a signal pseudo-random sequence P2. The reference pseudo-random sequence P0 is transmitted to the X-side time-series signal generation unit 155. The sequence for the signal pseudo-random sequence P1 is transmitted to the multiplier 153a. The sequence for the signal pseudo-random sequence P2 is transmitted to the multiplier 153b. A differentially encoded symbol (first symbol) of sub-signal data output from the differential encoding unit 25 is transmitted to the multiplier 153a. A differentially encoded symbol (second symbol) of sub-signal data to which a delay corresponding to one symbol is added from a delay unit 158 is transmitted to the multiplier 153b. The multiplier 153a multiplies the first symbol by the sequence for the signal pseudo-random sequence P1, and transmits a multiplication result to the X-side time-series signal generation unit 155 as the signal pseudo-random sequence P1. The multiplier 153b multiplies the second symbol by the sequence for the signal pseudo-random sequence P2, and transmits a multiplication result to the X-side time-series signal generation unit 155 as the signal pseudo-random sequence P2.

A pseudo-random sequence on a Y polarization-side which is output from the pseudo-random sequence generation unit 152 is split into a sequence for a reference pseudo-random sequence P0, a sequence for a signal pseudo-random sequence P1 and a sequence for a signal pseudo-random sequence P2. The reference pseudo-random sequence P0 is transmitted to the Y-side time-series signal generation unit 156. The sequence for the signal pseudo-random sequence P1 is transmitted to the multiplier 154a. The sequence for the signal pseudo-random sequence P2 is transmitted to the multiplier 154b. A symbol (first symbol) of sub-signal data which is output from the differential encoding unit 25 is transmitted to the multiplier 154a. A symbol (second symbol) of sub-signal data to which a delay corresponding to one symbol is added from the delay unit 158 is transmitted to the multiplier 154b. The multiplier 154a multiplies the first symbol by the sequence for the signal pseudo-random sequence P1, and transmits a multiplication result to the Y-side time-series signal generation unit 156 as the signal pseudo-random sequence P1. The multiplier 154b multiplies the second symbol by the sequence for the signal pseudo-random sequence P2, and transmits a multiplication result to the Y-side time-series signal generation unit 156 as the signal pseudo-random sequence P2.

In the second embodiment, two consecutive symbols in a symbol sequence of sub-signal data are stored in a single sub-signal frame and transmitted. Pseudo-random sequences P0, P1 and P2 on an X polarization-side are generated by the pseudo-random sequence generation unit 151, the multiplier 153a and the multiplier 153b. Pseudo-random sequences P0, P1 and P2 on a Y polarization-side are generated by the pseudo-random sequence generation unit 152, the multiplier 154a and the multiplier 154b. Among these, the pseudo-random sequence P0 is a reference pseudo-random sequence, and the pseudo-random sequence P1 is consistent with a product of the reference pseudo-random sequence P0 and the first symbol. The pseudo-random sequence P2 is consistent with a product of the reference pseudo-random sequence P0 and the second symbol. That is, the first symbol is coded into differential information between the reference pseudo-random sequence P0 and the signal pseudo-random sequence P1. The second symbol is coded into differential information between the reference pseudo-random sequence P0 and the signal pseudo-random sequence P2.

The X-side time-series signal generation unit 155 performs time-division multiplexing of the reference pseudo-random sequence P0, the signal pseudo-random sequence P1 and the signal pseudo-random sequence P2 on the X polarization-side to generate a single time-series signal as a DCSK-modulated signal on the X polarization-side. Similarly, the Y-side time-series signal generation unit 156 performs time-division multiplexing of the reference pseudo-random sequence P0, the signal pseudo-random sequence P1 and the signal pseudo-random sequence P2 on the Y polarization-side to generate a single time-series signal as a DCSK-modulated signal on the Y polarization-side. The DCSK-modulated signals on the X polarization-side and the Y polarization-side are transmitted to the main/sub-signal-multiplexing unit 27 as sub-signals.

Figure 6:
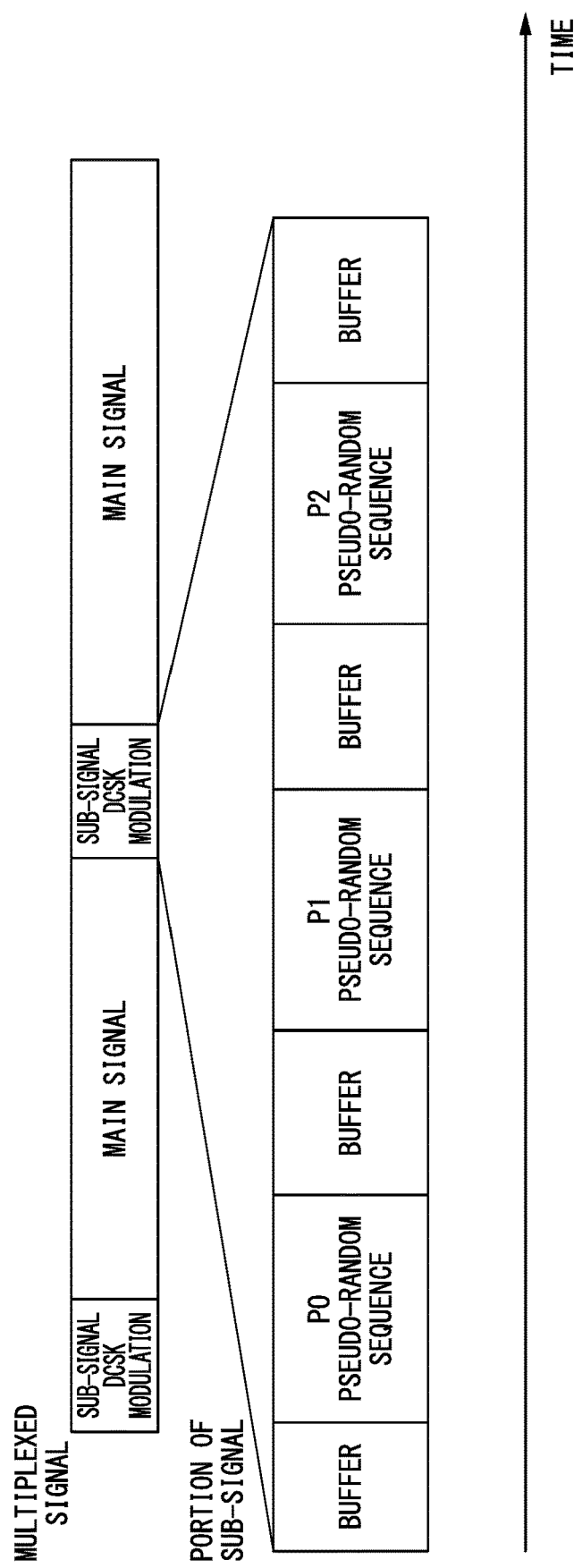
FIG. 6 is a diagram illustrating a structure of a signal which is time-multiplexed in the second embodiment.

FIG. 6 illustrates a structure of a multiplexed signal generated by the main/sub-signal-multiplexing unit 27 in the second embodiment. A multiplexed signal output from the main/sub-signal-multiplexing unit 27 is divided into periods of main signals and periods of sub-signals, and the main signals and the sub-signals are multiplexed in time division in the respective periods. A reference pseudo-random sequence P0, a signal pseudo-random sequence P1 and a signal pseudo-random sequence P2 are allocated to a portion allocated to the sub-signal by time-division multiplexing. A buffer sequence may be inserted among the reference pseudo-random sequence P0 and the signal pseudo-random sequences P1 and P2 or before or after the reference pseudo-random sequence P0 and the signal pseudo-random sequences P1 and P2.

Figure 7:
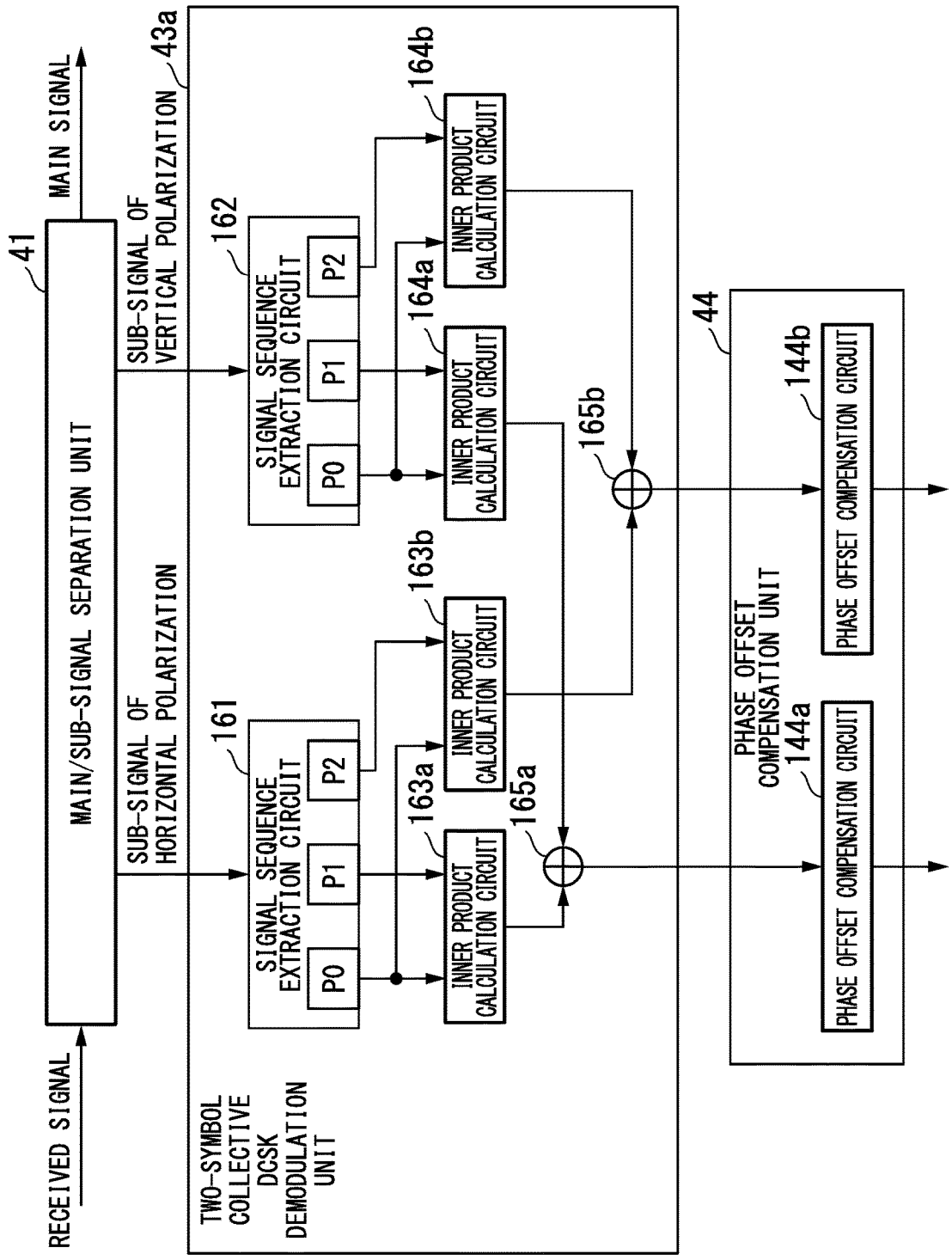
FIG. 7 is a diagram illustrating a configuration of a two-symbol collective DCSK demodulation unit in the second embodiment.

FIG. 7 illustrates a configuration of a two-symbol collective DCSK demodulation unit 43a in the optical data transmission system according to the second embodiment. The two-symbol collective DCSK demodulation unit 43a includes signal sequence extraction circuits 161 and 162, inner product calculation circuits 163a, 163b, 164a and 164b, and adders 165a and 165b.

The signal sequence extraction circuit 161 extracts sequence corresponding to a reference pseudo-random sequence P0 and signal pseudo-random sequences P1 and P2 from a sub-signal of horizontal polarization. The signal sequence extraction circuit 162 extracts sequence corresponding to a reference pseudo-random sequence P0 and signal pseudo-random sequences P1 and P2 from a sub-signal of vertical polarization.

The inner product calculation circuit 163a calculates an inner product of the reference pseudo-random sequence P0 and the signal pseudo-random sequence P1 extracted from the signal of horizontal polarization to reproduce a first symbol. The inner product calculation circuit 163b calculates an inner product of the reference pseudo-random sequence P0 and the signal pseudo-random sequence P2 extracted from the signal of horizontal polarization to reproduce a second symbol. Similarly, the inner product calculation circuit 164a calculates an inner product of the reference pseudo-random sequence P0 and the signal pseudo-random sequence P1 extracted from the signal of vertical polarization to reproduce a first symbol. The inner product calculation circuit 164b calculates an inner product of the reference pseudo-random sequence P0 and the signal pseudo-random sequence P2 extracted from the signal of vertical polarization to reproduce a second symbol.

The adder 165a adds the first symbol obtained from the inner product of the pseudo-random sequences P0 and P1 included in the sub-signal of horizontal polarization and the first symbol obtained from the inner product of the pseudo-random sequences P0 and P1 included in the sub-signal of vertical polarization. The adder 165b adds the second symbol obtained from the inner product of the pseudo-random sequences P0 and P2 included in the sub-signal of horizontal polarization and the second symbol obtained from the inner product of the pseudo-random sequences P0 and P2 included in the sub-signal of vertical polarization. The first and second symbols are synthesized by the respective additions, and the reliability of the first and second symbols is improved.

In the second embodiment, a first symbol is reproduced by calculating an inner product of a reference pseudo-random sequence P0 and a signal pseudo-random sequence P1, and a second symbol is reproduced by calculating an inner product of a reference pseudo-random sequence P0 and a signal pseudo-random sequence P2. A reproduced signal of the first symbol is output from the adder 165a, and a reproduced signal of the second symbol is output from the adder 165b.

A phase offset compensation unit 44 in the second embodiment independently includes phase offset compensation circuits 144a and 144b for a first symbol and a second symbol, as illustrated in FIG. 7. The phase offset compensation circuits 144a and 144b are operated in the same manner as the phase offset compensation unit in the first embodiment. The phase offset compensation unit 44 may perform phase offset compensation so as to be operated in cooperation with the first symbol and the second symbol.

The optical transmitter 10 or the optical receiver 30 in the above-described embodiments may be realized by a computer. In this case, the optical transmitter 10 or the optical receiver 30 may be realized by recording a program for realizing the function in a computer-readable recording medium and causing a computer system to read and execute the program recorded in the recording medium. Note that the "computer system" as mentioned herein includes hardware such as OS and peripheral devices. In addition, the "computer-readable recording medium" refers to a portable medium such as a flexible disc, a magneto-optical disc, a ROM, or a CD-ROM, or a storage device such as a hard disk built into the computer system. Further, the "computer-readable recording medium" may also include a medium dynamically holding the program for a short period of time such as a communication cable used when transmitting the program through a network such as the Internet or through a communication line such as a telephone line as well as a medium holding the program for a fixed period of time such as a volatile memory inside the computer system serving as a server or a client in the above-described case. The above-described program may also be for realizing some of the above-described functions, may be realized by combining the above-described functions with a program already recorded in the computer system, or may be realized using a programmable logic device such as a Field-Programmable Gate Array (FPGA).

While the embodiments of the present invention have been described above with reference to the accompanying drawings, the specific configuration is not limited to the above-described embodiments and also includes a design and the like without departing from the scope of the present invention.

INDUSTRIAL APPLICABILITY

The present invention can be applied to applications where it is necessary to suppress an adverse effect to be exerted on a main signal and to multiplex a signal for control with the main signal with high reliability.

REFERENCE SIGNS LIST

10 Optical transmitter
11 Transmission-side signal-processing device
12 Electro-optical conversion device
13 Optical fiber transmission path
21 Main signal generation unit
26 DCSK modulation unit
27 Main/sub-signal-multiplexing unit
30 Optical receiver
31 Photoelectric conversion device
32 Reception-side signal-processing device
41 Main/sub-signal separation unit
42 Main signal demodulation unit
43 DCSK demodulation unit
44 Phase offset compensation unit
51, 52 Pseudo-random sequence generation unit
53, 54 Multiplier
55 X-side time-series signal generation unit
56 Y-side time-series signal generation unit
61, 62 Signal sequence extraction unit
63, 64 Inner product calculation unit
65 Adder

The invention claimed is:

1. An optical transmitter of an optical data transmission system transmitting data through an optical fiber transmission path, the optical transmitter comprising:

a main signal generator that converts first transmission data into a predetermined signal format to generate a first signal;
a Differential Code Shift Keying (DCSK) modulator that DCSK-modulates second transmission data using a pseudo-random sequence to generate a second signal having a power spectrum similar to the first signal, the pseudo-random sequence having a same baud rate as a first baud rate at which the first signal is generated, and the second transmission data being modulated at a second baud rate lower than the first baud rate;
a signal-multiplexer that performs time-division multiplexing of the first signal and the second signal; and
an electro-optical converter that converts a multiplexed signal obtained by the time-division multiplexing of the signal-multiplexer from an electric signal into an optical signal, and outputs the optical signal to the optical fiber transmission path.

2. The optical transmitter according to claim 1, further comprising:
a mapper that maps the second transmission data to a point on a signal space diagram to generate a symbol,
wherein the DCSK modulator includes
a reference pseudo-random sequence generation circuit that generates a reference pseudo-random sequence,
a signal pseudo-random sequence generation circuit that generates a signal pseudo-random sequence, and
a time-series signal generator that time-division multiplexes the reference pseudo-random sequence and the signal pseudo-random sequence to generate a single time-series signal as the second signal, and
wherein the signal pseudo-random sequence is consistent with a product of the reference pseudo-random sequence and the symbol.

3. The optical transmitter according to claim 1, further comprising:
a mapper that maps the second transmission data to a point on a signal space diagram to generate a symbol,
wherein the DCSK modulator includes
a pseudo-random sequence generator that generates a pseudo-random sequence,
a multiplier that multiplies the pseudo-random sequence by the symbol and outputs a multiplication result as a signal pseudo-random sequence, and
a time-series signal generator that time-division multiplexes the pseudo-random sequence and the signal pseudo-random sequence to generate a single time-series signal as the second signal.

4. An optical receiver of an optical data transmission system transmitting data through an optical fiber transmission path, the optical receiver comprising:
a photoelectric converter that converts an optical signal received through the optical fiber transmission path into an electric signal;
a signal separator that separates a first signal and a second signal from the electric signal, the first and second signals having been time-division multiplexed;
a main signal demodulator that demodulates the first signal separated by the signal separator to reproduce first transmission data; and
a Differential Code Shift Keying (DCSK) demodulator that DCSK-demodulates the second signal separated by the signal separator using a pseudo-random sequence to reproduce second transmission data that is modulated at a second baud rate lower than a first baud rate at which the first signal is generated, the pseudo-random sequence having a same baud rate as the first baud rate.

5. The optical receiver according to claim 4, wherein the DCSK demodulator includes:
a signal sequence extractor that identifies a reference pseudo-random sequence and a signal pseudo-random sequence and extracts the identified sequences from the second signal; and
an inner product calculator that calculates an inner product of the reference pseudo-random sequence and the signal pseudo-random sequence and outputs the inner product as the second transmission data.

6. An optical data transmission system comprising:
an optical transmitter includes
a main signal generator that converts first transmission data into a predetermined signal format to generate a first signal,
a Differential Code Shift Keying (DCSK) modulator that DCSK-modulates second transmission data using a pseudo-random sequence to generate a second signal having a power spectrum similar to the first signal, the pseudo-random sequence having a same baud rate as a first baud rate at which the first signal is generated, and the second transmission data being modulated at a second baud rate lower than the first baud rate;
a signal-multiplexer that performs time-division multiplexing of the first signal and the second signal, and
an electro-optical converter that converts a multiplexed signal obtained by the time-division multiplexing of the signal-multiplexer from an electric signal into an optical signal, and outputs the optical signal to an optical fiber transmission path; and
an optical receiver includes
a photoelectric converter that converts the optical signal received through the optical fiber transmission path into an electric signal,
a signal separator that separates the first signal and the second signal from the electric signal converted by the photoelectric converter,
a main signal demodulator that demodulates the first signal separated by the signal separator to reproduce first transmission data, and
a DCSK demodulator that DCSK-demodulates the second signal separated by the signal separator using a pseudo-random sequence having the first baud rate to reproduce the second transmission data.

7. An optical transmission method performed by an optical transmitter of an optical data transmission system transmitting data through an optical fiber transmission path, the optical transmission method comprising:
a main signal generation step of converting first transmission data into a predetermined signal format to generate a first signal;
a Differential Code Shift Keying (DCSK) modulation step of DCSK-modulating second transmission data using a pseudo-random sequence to generate a second signal having a power spectrum similar to the first signal, the pseud-random sequence having a same baud rate as a first baud rate at which the first signal is generated, and the second transmission data being modulated at a second baud rate lower than the first baud rate;
a signal-multiplexing step of performing time-division multiplexing of the first signal and the second signal; and
an electro-optical conversion step of converting a multiplexed signal obtained by the time-division multiplexing performed in the signal-multiplexing step from an electric signal into an optical signal, and outputting the optical signal to the optical fiber transmission path.

8. An optical reception method performed by an optical receiver of an optical data transmission system transmitting data through an optical fiber transmission path, the optical reception method comprising:
  a photoelectric conversion step of converting an optical signal received through the optical fiber transmission path into an electric signal;
  a signal separation step of separating a first signal and a second signal from the electric signal, the first and second signals having been time-division multiplexed;
  a main signal demodulation step of demodulating the first signal separated in the signal separation step to reproduce first transmission data; and
  a Differential Code Shift Keying (DCSK) demodulation step of DCSK-demodulating the second signal separated in the signal separation step using a pseudo-random sequence to reproduce second transmission data that is modulated at a second baud rate lower than a first baud rate at which the first signal is generated, the pseudo-random sequence having a same baud rate as the first baud rate.

* * * * *